US012810198B2

(12) United States Patent
Kim

(10) Patent No.: US 12,810,198 B2
(45) Date of Patent: Nov. 24, 2026

(54) METHOD AND APPARATUS FOR PRE-TRAINING ARTIFICIAL INTELLIGENCE MODELS

(71) Applicant: Socra AI Inc., Seoul (KR)

(72) Inventor: Byung Soo Kim, Seoul (KR)

(73) Assignee: Socra AI Inc., Seoul (KR)

( * ) Notice: Subject to any disclaimer, the term of this patent is extended or adjusted under 35 U.S.C. 154(b) by 401 days.

(21) Appl. No.: 17/776,798

(22) PCT Filed: Feb. 15, 2022

(86) PCT No.: PCT/KR2022/002221
§ 371 (c)(1),
(2) Date: May 13, 2022

(87) PCT Pub. No.: WO2022/196955
PCT Pub. Date: Sep. 22, 2022

(65) Prior Publication Data

US 2024/0169249 A1 May 23, 2024

(30) Foreign Application Priority Data

Mar. 15, 2021 (KR) ........................ 10-2021-0033271
Jul. 20, 2021 (KR) ........................ 10-2021-0094882

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

FOREIGN PATENT DOCUMENTS

| | | | |
|---|---|---|---|
| CN | 110111803 | A | 8/2019 |
| KR | 10-2019-0101692 | A | 9/2019 |
| KR | 10-2020-0057291 | A | 5/2020 |
| KR | 10-2396981 | B1 | 5/2022 |

OTHER PUBLICATIONS

Clark, Kevin, et al. "Electra: Pre-training text encoders as discriminators rather than generators." arXiv preprint arXiv:2003.10555 (2020). (Year: 2020).*

Choi, Youngduck, et al. "Assessment modeling: fundamental pre-training tasks for interactive educational systems." arXiv preprint arXiv:2002.05505v1 (2020). (Year: 2020).*

(Continued)

*Primary Examiner* — Miranda M Huang
(74) *Attorney, Agent, or Firm* — USX IP LLC

(57) ABSTRACT

A method for pre-training artificial intelligence models to predict a score of a user by a server, comprises: generating a first sequence for training a first model, wherein the first sequence includes a masked element related to an exercise for predicting the score of the user; inputting the first sequence to the first model to train the first model; and inputting a second sequence to a second model predicted by the first model on the basis of the first sequence to train the second model, wherein the second model is trained through comparison between the first sequence and a third sequence predicted through the second model on the basis of the second sequence.

11 Claims, 4 Drawing Sheets

(56) References Cited

OTHER PUBLICATIONS

Lample, Guillaume, et al. "Unsupervised machine translation using monolingual corpora only." arXiv preprint arXiv:1711.00043v2 (2018). (Year: 2018).*
Lee et al., "Meticulous and easy to understand Electra paper review", Review of Electra: Pre-training Text Encoders as Discriminators Rather Than Generators, Ping-Pong Team Blog, May 5, 2020, <https://blog.pingpong.us/electra-review> (29 pages total).
Kevin Clark, "Electra: Pre-Training Text Encoders as Discriminators Rather Than Generators", arXiv:2003.10555v1, Mar. 23, 2020, <https://arxiv.org/pdf/2003.10555v1.pdf> (20 pages total).
International Search Report dated May 18, 2022 from the International Searching Authority in International Application No. PCT/KR2022/002221.
Written Opinion dated May 18, 2022 from the International Searching Authority in International Application No. PCT/KR2022/002221.
Joo Hong Lee "Review of Electra: Pre-training Text Encoders as Discriminators Rather Than Generators", Meticulous and easy to understand Electra paper review, May 8, 2020, 21 pgs.
"Create your own language model—Bert Pretrained Language Model (Masked Language Model)" nawnoes, Mar. 15, 2021, 21 pgs.
Communication dated Dec. 20, 2023 issued by the Korean Patent Office in application No. 10-2022-0056349.

* cited by examiner

METHOD AND APPARATUS FOR PRE-TRAINING ARTIFICIAL INTELLIGENCE MODELS

TECHNICAL FIELD

The present description relates to a method and an apparatus for pre-training artificial intelligence models to predict a score of a user.

BACKGROUND ART

Transfer learning means that a weight of a model trained with a large data set is recalibrated and used in accordance with a task to be solved. Through this, it is possible to train an artificial intelligence model to solve the problem to be solved even with a relatively small number of data.

In transfer learning, when there is not enough data to train an artificial intelligence model for a specific task A, the artificial intelligence model is pre-trained using another task B with sufficient learning data related to the task A, and then the pre-trained model is trained again with the task A. The transfer learning is a topic that is being actively studied in the field of machine learning to solve the problem of data shortage.

Even in the field of artificial intelligence related to education, there is a problem of insufficient data for training artificial intelligence models. For example, in order to train a model for a task to predict student TOEIC test scores of students, TOEIC test score data is necessary. However, in order to obtain TOEIC test score data, it is required that students pay to register for the test, go to the test site and take the test, and report the test scores. As described above, since a process of collecting the TOEIC test score data is complicated, there may be a problem that the amount of data that can be collected is not large.

SUMMARY OF INVENTION

Technical Problem

The present description is to provide a method and an apparatus for pre-training artificial intelligence models to predict a score of a user.

In addition, the present description is to provide a method for predicting a score of a user with high accuracy through pre-trained artificial intelligence models.

The technical problems to be achieved by the present description are not limited to the technical problems mentioned above, and other technical problems not mentioned can be clearly understood to those of ordinary skill in the art to which the present description belongs from the detailed description of the following description.

Solution to Problem

According to an aspect of the present description, there is provided a method for pre-training artificial intelligence models to predict a score of a user by a server, comprising: generating a first sequence for training a first model, wherein the first sequence includes a masked element related to an exercise for predicting the score of the user; inputting the first sequence to the first model to train the first model; and inputting a second sequence predicted by the first model to a second model on the basis of the first sequence to train the second model, wherein the second model is trained through comparison between the first sequence and a third sequence predicted through the second model on the basis of the second sequence.

In addition, the first sequence may include (1) an identifier of an exercise, (2) a specific part representing a type of the exercise, and (3) an element representing an answer of the user about the exercise.

In addition, the masked element may be an element representing the answer of the user about the exercise.

In addition, the first sequence including the masked element may be randomly determined on the basis of generation of a plurality of first sequences.

In addition, the method for pre-training may further comprise: removing the first model; generating a fourth sequence for fine-tuning the second model, with the second model; and fine-tuning the second model using the fourth sequence.

In addition, the fine-tuned second model may be pre-trained to predict the score of the user.

In addition, referring to Equation 3, the fine-tuned second model may predict a test score of the user on the basis of a third loss function which is the sum of a first loss function related to an output value of the first model and a second loss function related to an output value of the second model.

According to another aspect of the present description, there is provided a server which pre-trains artificial intelligence models to predict a score of a user, including: a communication module; a memory; and a processor, wherein the processor generates a first sequence for training a first model, and the first sequence includes a masked element related to an exercise for predicting the score of the user, wherein the first sequence is input to the first model to train the first model, and a second sequence predicted by the first model is input to a second model on the basis of the first sequence to train the second model, and wherein the second model is trained through comparison between the first sequence and a third sequence predicted through the second model on the basis of the second sequence.

Advantageous Effects of Invention

According to an embodiment of the present description, it is possible to implement a method and an apparatus for pre-training artificial intelligence models to predict a score of a user.

In addition, according to an embodiment of the present description, it is possible to predict a score of a user with high accuracy through pre-trained artificial intelligence models.

The effects obtainable in the present description are not limited to the above-mentioned effects, and other effects not mentioned will be clearly understood by those of ordinary skill in the art to which the present description belongs from the description below.

Figure 1:
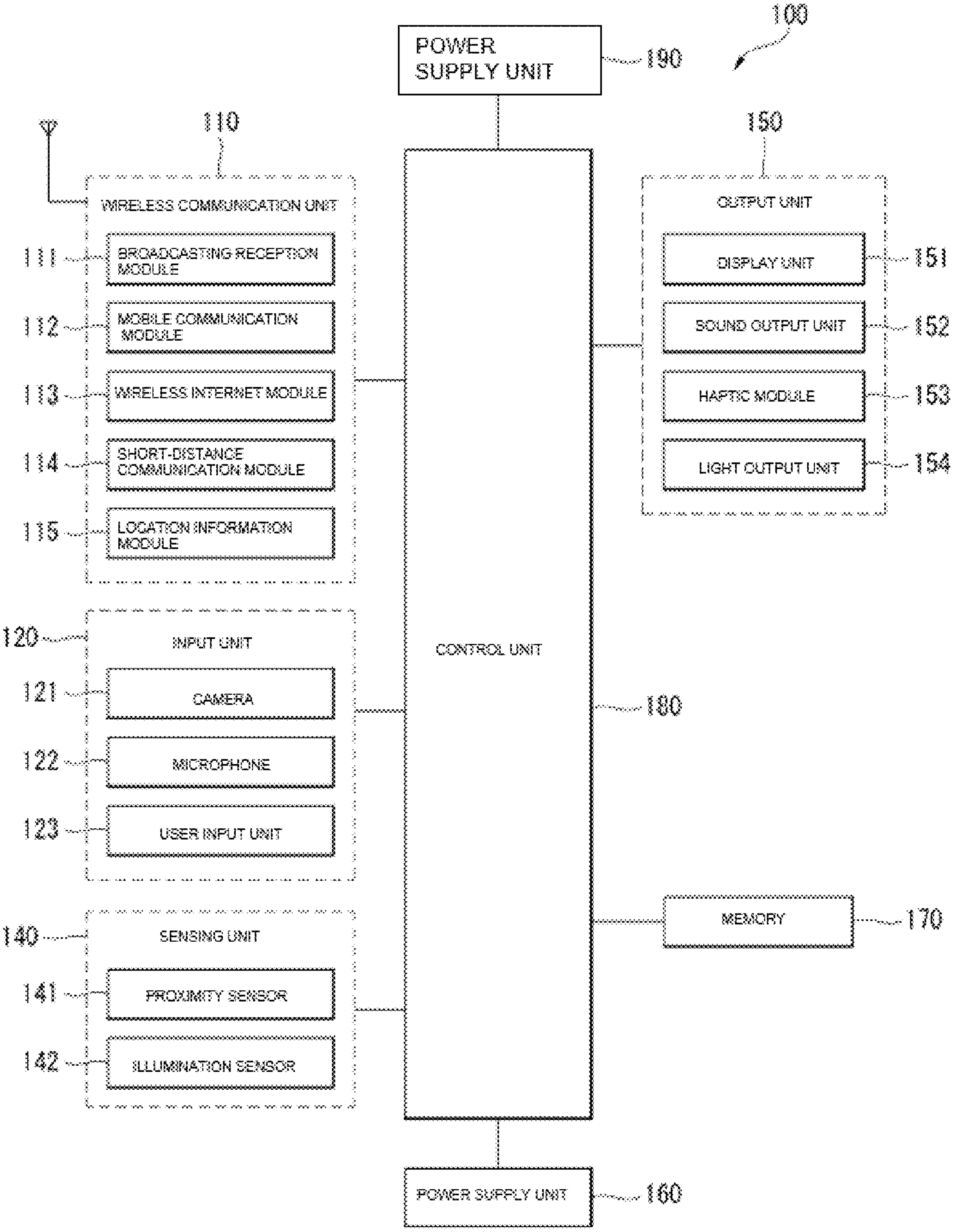
FIG. 1 is a block diagram illustrating an electronic apparatus related to the present description.

The accompanying drawings, which are included as a part of the detailed description to help the understanding of the present description, provide embodiments of the present description, and explain the technical features of the present description together with the detailed description.

DESCRIPTION OF EMBODIMENTS

Hereinafter, embodiments disclosed in the present description will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the description, and do not have distinct meanings or roles by themselves. In addition, in describing the embodiments disclosed in the present description, if it is determined that detailed descriptions of related known technologies may obscure the gist of the embodiments disclosed in the present description, the detailed description thereof will be omitted. In addition, the accompanying drawings are only for easy understanding of the embodiments disclosed in the present description, and the technical spirit disclosed in the present description is not limited by the accompanying drawings, and all changes included in the spirit and scope of the present description, should be understood to include equivalents or substitutes.

Terms including an ordinal number, such as first, second, etc., may be used to describe various components, but the components are not limited by the terms. The above terms are used only for the purpose of distinguishing one component from another.

When a component is referred to as being "connected" or "linked" to another component, it should be understood that the component may be directly connected or linked to the other component, but another component may exist in between. Meanwhile, when a component is referred to as being "directly connected" or "directly linked", it should be understood that there is no other component in between.

Singular expression includes plural expression unless the context clearly dictates otherwise.

In the present application, terms such as "include" or "have" are intended to designate that features, numbers, steps, operations, components, parts, or combinations thereof exist, but it should be understood that it does not preclude the possibility of addition or existence of or more features, numbers, one steps, operations, components, parts, or combinations thereof.

FIG. 1 is a block diagram illustrating an electronic apparatus according to the present description.

The electronic apparatus 100 may include a wireless communication unit 110, an input unit 120, a sensing unit 140, an output unit 150, an interface unit 160, a memory 170, a control unit 180, a power supply unit 190, and the like. Since components illustrated in FIG. 1 are not essential to implement the electronic apparatus, the electronic apparatus described in the description may have more or fewer components than the components listed above.

More specifically, the wireless communication unit 110 among the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-distance communication module 114, and a location information module 115.

The input unit 120 may include a camera 121 or a video input unit for inputting a video signal, a microphone 122 or an audio input unit for inputting an audio signal, and a user input unit 123 (e.g., touch key, push key (mechanical key), etc.) for receiving information from a user. Sound data or image data collected from the input unit 120 may be analyzed and processed by a control command of a user.

The sensing unit 140 may include one or more sensors for sensing at least one of information in the electronic apparatus, surrounding environment information surrounding the electronic device, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environmental sensors (e.g., barometer, hygrometer, thermometer, radiation sensor, thermal sensor, gas sensor, etc.), and a chemical sensor (e.g., electronic nose, healthcare sensor, biometric sensor, etc.). Meanwhile, the electronic apparatus disclosed in the present description may utilize combination of information sensed by at least two sensors of such sensors.

The output unit 150 is for generating an output related to visual, auditory, tactile, or the like, and may include at least one of a display unit 151, a sound output unit 152, a haptic module 153, and a light output unit 154. The display unit 151 has an inter-layer structure or is formed integrally with a touch sensor, thereby implementing a touch screen. Such a touch screen may serve as a user input unit 123 providing an input interface between the electronic apparatus 100 and a user and may simultaneously provide an output interface between the electronic apparatus 100 and the user.

The interface unit 160 serves as a passage from and to various types of external devices connected to the electronic apparatus 100. Such an interface unit 160 may include at least one of a wired/wireless headset port, an external charger port, a wired/wireless data port, a memory card port, a port connecting a device provided with an identification module, an audio I/O (input/output) port, a video I/O port (input/output) port, and an earphone port. In the electronic apparatus 100, it is possible to perform appropriate control related to the connected external device in response to connection of the external device to the interface unit 160.

In addition, the memory 170 stores data supporting various functions of the electronic apparatus 100. The memory 170 may store a plurality of application programs (applications) running in the electronic apparatus 100, data for operation of the electronic apparatus 100, and commands. At least a part of such application programs may be downloaded from an external server through wireless communication. In addition, at least a part of such application programs may be provided on the electronic apparatus 100 from the time of shipment for basic functions (e.g., functions of receiving and making calls, receiving and sending messages) of the electronic apparatus 100. Meanwhile, the application program may be stored in the memory 170, provided on the electronic apparatus 100, and be run to perform operations (or functions) of the electronic apparatus by the control unit 180.

Generally, the control unit 180 controls overall operations of the electronic apparatus 100 in addition to operations related to the application programs. The control unit 180 processes signals, data, information, and the like that are input or output through the components described above, or runs the application programs stored in the memory 170, thereby providing or processing information or functions appropriate for a user.

In addition, the control unit 180 may control at least a part of the components illustrated in FIG. 1 to run the application programs stored in the memory 170. Furthermore, the control unit 180 may combine and operate at least two of the components included in the electronic apparatus 100 to run the application program.

The power supply unit 190 supplies power to each component included in the electronic apparatus 100 by receiving external power or internal power under the control of the control unit 180. Such a power supply unit 190 includes a battery, and the battery may be a built-in battery or a replaceable battery.

At least a part of the components may operate cooperatively to implement an operation, control, or control method of the electronic apparatus according to various embodiments described below. In addition, the operation, control, or control method of the electronic apparatus may be implemented on the electronic apparatus by running of at least one application program stored in the memory 170.

In the present description, the electronic apparatus 100 may be collectively referred to as a terminal.

Figure 2:
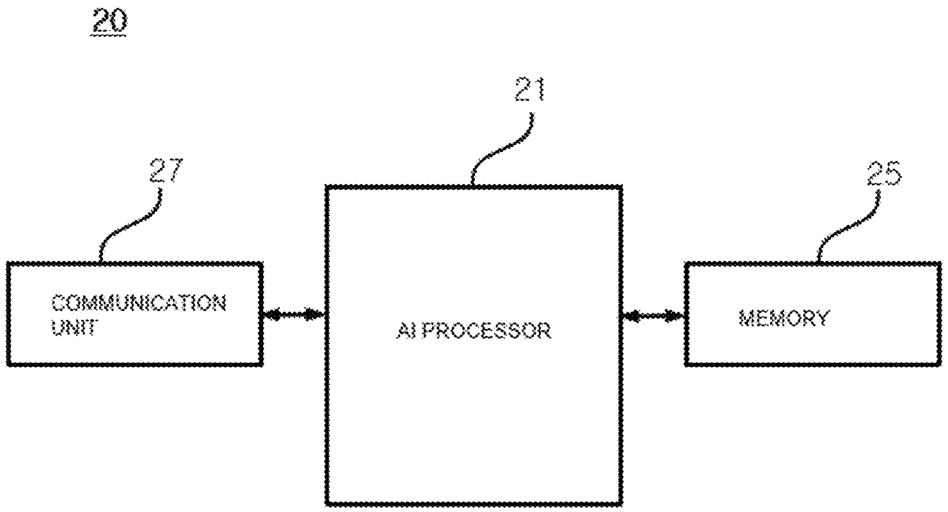
FIG. 2 is a block diagram illustrating an AI apparatus according to an embodiment of the present description.

FIG. 2 is a block diagram illustrating an AI apparatus according to an embodiment of the present description.

The AI apparatus 20 may include an electronic apparatus including an AI module capable of performing AI processing, a server including the AI module, or the like. In addition, the AI apparatus 20 may be included as at least a part of the electronic apparatus 100 illustrated in FIG. 1 and perform at least a part of AI processing together.

The AI apparatus 20 may include an AI processor 21, a memory 25, and/or a communication unit 27.

The AI apparatus 20 is a computing device capable of learning a neural network, and may be implemented by various electronic apparatuses such as a server, a desktop PC, a laptop PC, and a tablet PC.

The AI processor 21 may learn a neural network using a program stored in the memory 25. Particularly, the AI processor 21 may learn the neural network to recognize data for predicting a test score.

Meanwhile, the AI processor 21 performing the above-described functions may be a general-purpose processor (e.g., CPU), but may be an AI-exclusive processor (e.g., GPU) for artificial intelligence learning.

The memory 25 may store various programs and data necessary for operation of the AI apparatus 20. The memory 25 may be implemented by a non-volatile memory, a volatile memory, a flash memory, a hard disk drive (HDD), or a solid-state drive (SSD). The memory 25 is accessed by the AI processor 21, in which reading/writing/modification/deletion/update of data may be performed by the AI processor 21. In addition, the memory 25 may store a neural network model (e.g., deep learning model) generated through learning algorithm for data classification/recognition according to an embodiment of the present description.

Meanwhile, the AI processor 21 may include a data learning unit which learns a neural network for data classification/recognition. For example, the data learning unit acquires learning data to be used in learning and applies the acquired learning data to a deep learning model, thereby learning a deep learning model.

The communication unit 27 may transmit an AI processing result of the AI processor 21 to an external electronic apparatus.

Herein, the external electronic apparatus may include another terminal and a server.

Meanwhile, the AI apparatus 20 illustrated in FIG. 2 has been described by functional division of the AI processor 21, the memory 25, the communication unit 27, and the like, but the above-described components may be integrated into one module, which may be referred to as an AI module or an artificial intelligence (AI) model.

Figure 3:
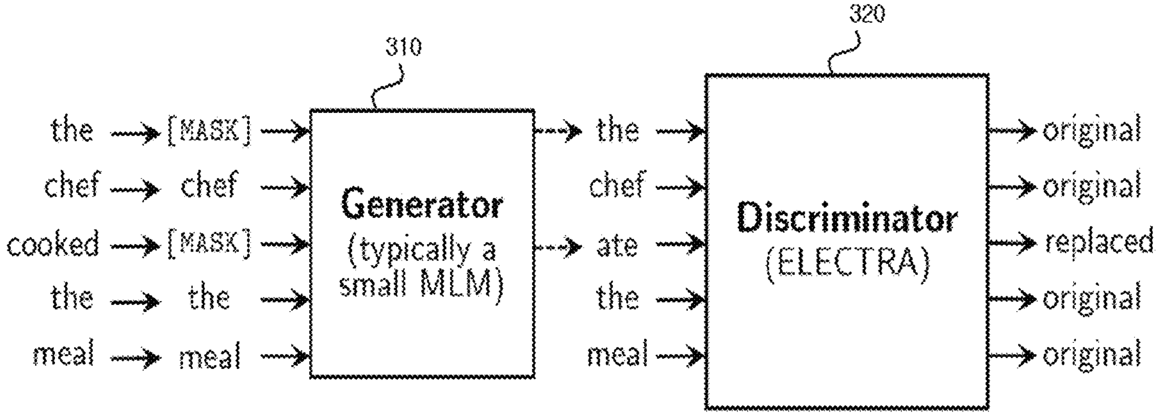
FIG. 3 is a diagram illustrating an example of a general method of pre-training according to an embodiment of the present description.

FIG. 3 is a diagram illustrating an example of a general method for pre-training according to the present description.

Transfer training is being actively studied in the field of natural language processing, and ELECTRA (Pre-training Text Encoders as Discriminators Rather Than Generators) can exhibit better performance while using fewer computing resources than existing transfer training methods.

Referring to FIG. 3, a generator 310 may be trained to receive an input sequence of which a part is masked and predict what the masked part is. A discriminator 320 may be trained to receive an output sequence of the generator 310 as an input and predict whether each token of the input sequence is the output of the generator 310 (e.g., replaced) or was originally in the input sequence (e.g., original). After such pre-training is finished, fine tuning may be performed the using trained discriminator 320.

Figure 4:
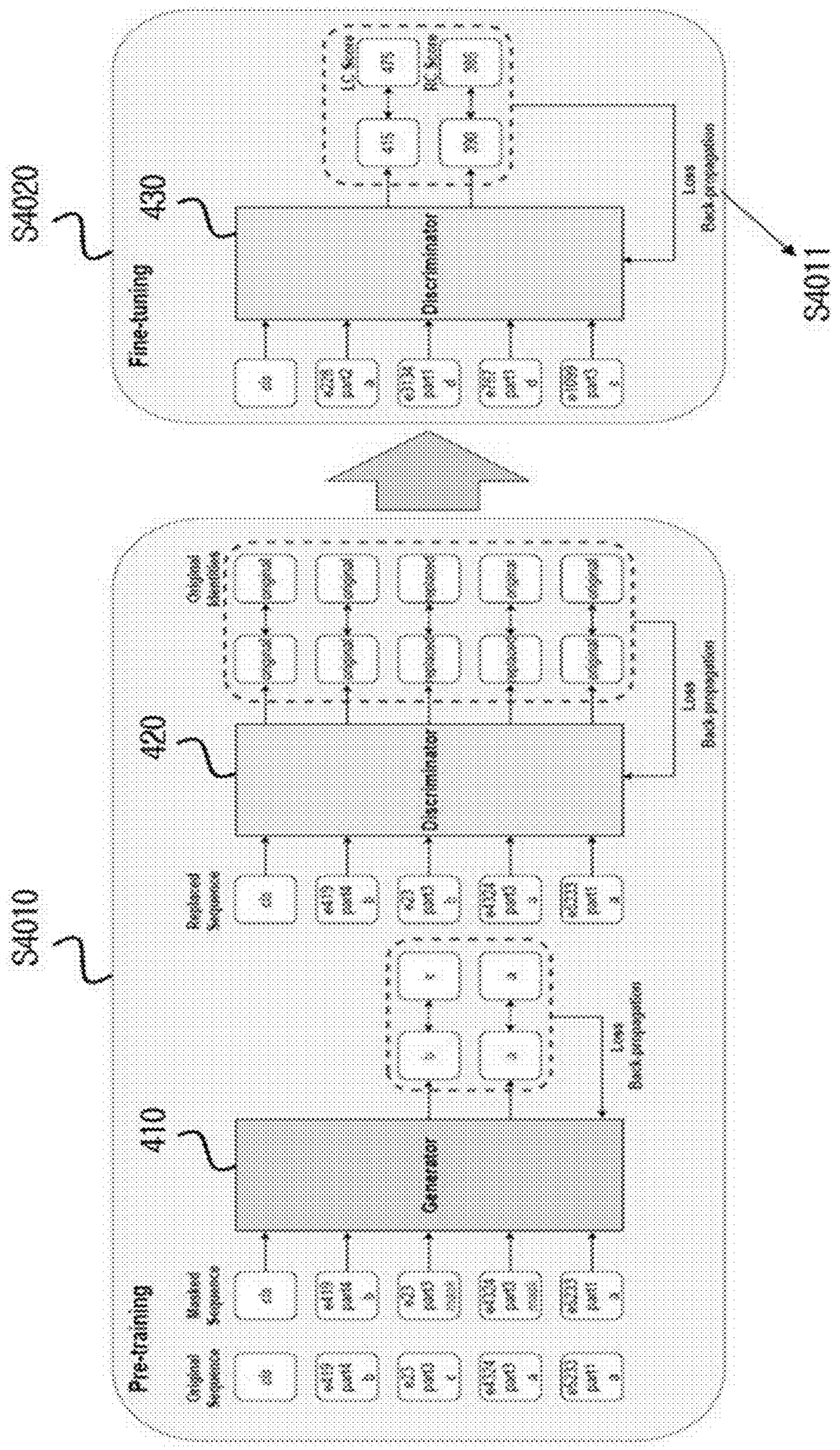
FIG. 4 is a diagram illustrating an embodiment according to the present description.

FIG. 4 is a diagram illustrating an embodiment of the present description.

Referring to FIG. 4, an AI model of a server includes a generator 410 and a discriminator 420.

(1) Pre-Training S4010

The server may configure tokens of an input sequence of the generator 410 as tuple.

The following Table 1 illustrates an example of tokens of an input sequence according to the present description.

TABLE 1

| Token name | Descriptions |
|---|---|
| eid | ID of an exercise |
| part | Specific part representing a type of an exercise |
| response | User's answer about an exercise (e.g., when an exercise is TOEIC, this is user's answer about 'a', 'b', 'c', or 'd') |
| correctness | Whether user's answer about an exercise is correct or not |
| elapsed_time | Time elapsed for users to solve an exercise |
| timeliness | Whether a user solved an exercises in a time limit |
| exp_time | Time a user spent studying a solved exercise |
| inactive_time | Time interval between a current exercise and a previous exercise |

For example, for stabilization of the training process, the server may normalize values of elapsed_time, exp_time, and inactive_time to values between 0 and 1.

The generator 410 may supply an input sequence $I^M$ to an interaction embedding layer (InterEmbedding), a point-wise feed-forward layer (GenFeedForward1), the performer encoder (GenPerformerEncoder), and another point-wise feed-forward layer (GenFeedForward2) to calculate $$[h_1^G, \ldots, h_T^G]$$

which is hidden representations.

Table 2 illustrates an example of InterEmbedding, GenFeedForward1, GenPerformerEncoder, and GenFeedForward2.

TABLE 2

| |
|---|
| $[I_1^{ME}, \ldots, I_T^{ME}] = \text{InterEmbedding}([I_1^{M}, \ldots, I_T^{M}])$ |
| $[h_1^{GF}, \ldots, h_T^{GF}] = \text{GenFeedForward1}([I_1^{ME}, \ldots, I_T^{ME}])$ |
| $[h_1^{GP}, \ldots, h_T^{GP}] = \text{GenPerformerEncoder}([h_1^{GF}, \ldots, h_T^{GF}])$ |
| $[h_1^{G}, \ldots, h_T^{G}] = \text{GenFeedForward2}([h_1^{GP}, \ldots, h_T^{GP}])$, |

Referring to Table 2, $$I_t^{ME}, h_t^G \in \mathbb{R}^{d_{emb}} \text{ and } h_t^{GF}, h_t^{GP} \in \mathbb{R}^{d_{gen\_hidden}}$$

can be seen.

Referring to FIG. 4 again, the server may generate input sequences [(e419, part4, b), (e23, part3, c), (e4324, part3, a), (e5233, part1, a)] of the generator 410 configured with eid/part/response.

The server may determine an input sequence to be masked among them. For example, the server may randomly determine an input sequence to be masked among a plurality of input sequences, and mask a response element included in the determined input sequence. More specifically, the server may decide to mask the second and third input sequences, mask response elements included in the input sequences, and generate [(e419, part4, b), (e23, part3, mask), (e4324, part3, mask), (e5233, part1, a)] which is a masked sequence.

The server may input the masked sequence to the generator 410 to train the generator 410. The generator 410 may output a replaced sequence in which the masked token is replaced, using the masked sequence as an input value and the masked token as a predicted value. In addition, the server may train the generator 410 using a loss function in which the replaced sequence as the output of the generator 410 and the unmasked input sequence (original) are compared.

The generator 410 may calculate an output differently according to whether the masked element is a categorical variable or a continuous variable. For example, when the masked element is the categorical variable, it may be sampled in probability distribution defined by a softmax layer according to the following Equation 1.

$$O_{ij}^G \sim P_G(f_{M_i}^j \mid I^M) = \text{softmax}(E_j h_{M_i}^G) \quad \text{[Equation 1]}$$

If the masked element is the continuous variable, the output may be calculated by a sigmoid layer according to the following Equation 2.

$$O_{ij}^G = \text{sigmoid}(E_j^\top h_{M_i}^G) \quad \text{[Equation 2]}$$

More specifically, similarly to the categorical variable, when the masked element is the continuous variable, the output may be sampled on the basis of probability distribution defined by $I^M$ and parameters of the generator 410.

For example, when the masked token is predicted as 'b' and 'a', the replaced sequence output from the generator 410 through the input sequence may be [(e419, part4, b), (e23, part3, b), (e4324, part3, a), (e5233, part1, a)].

The server may be trained to input the replaced sequence to the discriminator 420 and predict whether each token is the output of the generator 410 (replaced) or was originally in the input sequence (original).

For example, the output of the discriminator 420

$$O^D = [O_1^D, \ldots, O_T^D]$$

may be calculated by applying a series of an interaction embedding layer (InterEmbedding), a point-wise feed-forward layer (DisFeedForward1), the performer encoder (DisPerformerEncoder), and another point-wise feed-forward layer (DisFeedForward2) to the replaced interaction sequence $I^R$.

The following table 3 illustrates an example of InterEmbedding, DisFeedForward1, DisPerformerEncoder, and DisFeedForward2.

TABLE 3

| |
|---|
| $[I_1^{RE}, \ldots, I_T^{RE}] = \text{InterEmbedding}([I_1^{R}, \ldots, I_T^{R}])$ |
| $[h_1^{DF}, \ldots, h_T^{DF}] = \text{DisFeedForward1}([I_1^{RE}, \ldots, I_T^{RE}])$ |
| $[h_1^{DP}, \ldots, h_T^{DP}] = \text{DisPerformerEncoder}([h_1^{DF}, \ldots, h_T^{DF}])$ |
| $[O_1^{D}, \ldots, O_T^{D}] = \text{DisFeedForward2}([h_1^{DP}, \ldots, h_T^{DP}])$, |

Referring to Table 3, $$I_t^{RE} \in \mathbb{R}^{d_{emb}}, h_t^{DF}, h_t^{DP} \in \mathbb{R}^{d_{dis\_hidden}}, O_t^D \in \mathbb{R},$$

can be seen, and sigmoid may be applied to the last layer of the discriminator 420. After pre-training, the server may replace the last layer by a layer having an appropriate dimension for predicting a test score to modify the discriminator 420.

The purpose of such pre-training S4010 is to minimize a loss function 4011. The following Equation 3 is an example of the loss function according to the present description.

$$\sum_{i=1}^{m}\sum_{j=1}^{n} GenLoss(O_{ij}^G, f_{M_i}^j) + \lambda \sum_{t=1}^{T} DisLoss(O_t^D, \mathbb{1}(I_t^R = I_t)) \quad \text{[Equation 3]}$$

Referring to Equation 3, for example, when a masked element is a categorical variable or a continuous variable, GenLoss may be a cross entropy or mean squared error loss function, DisLoss may be a binary cross entropy loss function, and $\mathbb{1}$ may be an identity function. If the number of masked elements is two or more, the generator 410 may be trained by a multi-task learning scheme.

(2) Fine-Tuning S4020

When the pre-training is finished, the server may remove the generator 410 and fine-tune the pre-trained discriminator 430 to raise accuracy of the pre-trained discriminator 430. For example, in order to perform a score prediction task, the server may input the input sequence to the pre-trained discriminator 430 to train the pre-trained discriminator 430 to predict a test score of a user.

The embodiment described above is not limited to the task of predicting the test score, and the pre-training may be applied to various tasks of artificial intelligence field related to education such as prediction of learning session dropout rate, prediction of learning content recommendation acceptance, and prediction of lecture viewing time.

The following Table 4 illustrates an example of test score prediction performance measured for each task of pre-training.

TABLE 4

| Pre-training task | MAE |
|---|---|
| response | 50.65 ± 1.26 |
| response + elapsed_time | 54.86 ± 1.64 |
| response + timeliness | 52.91 ± 1.38 |
| response + exp_time | 57.54 ± 1.47 |
| response + inactive_time | 60.69 ± 1.74 |
| correctness | 51.36 ± 0.97 |
| correctness + elapsed_time | 53.36 ± 1.43 |
| correctness + timeliness | 52.60 ± 1.20 |
| correctness + exp_time | 54.36 ± 1.62 |
| correctness + inactive_time | 55.04 ± 1.58 |
| response + correctness | 51.13 ± 1.60 |
| response + correctness + elapsed_time | 52.15 ± 1.43 |
| response + correctness + timeliness | 53.05 ± 1.81 |
| response + correctness + exp_time | 53.09 ± 1.25 |
| response + correctness + inactive_time | 56.41 ± 1.72 |

Referring to Table 4, when the server masks only response for pre-training, the best result may be obtained as accuracy of score prediction MAE (Mean. Absolute Error).

Figure 5:
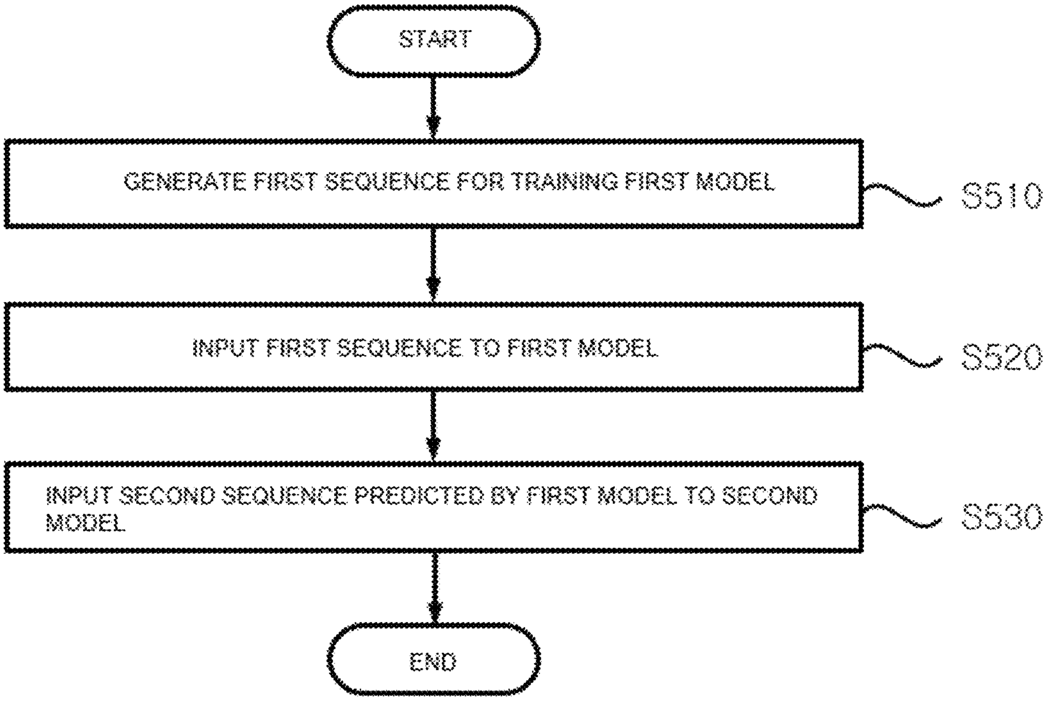
FIG. 5 is a diagram illustrating a server according to an embodiment of the present description.

FIG. 5 is a diagram illustrating an embodiment of a server according to the present description.

Referring to FIG. 5, an AI model of a server may include a generator 410 and a discriminator 420, and the generator 410 may correspond to a first model and the discriminator 420 may correspond to a second model.

The server generates a first sequence for training the first model (S510). For example, the first sequence may include the elements of Table 1 described above. More specifically, the first sequence may include (1) an identifier of an exercise, (2) a specific part representing a type of the exercise, and (3) an element representing an answer of the user about the exercise. In addition, the first sequence may include a masked element related to an exercise for predicting a score of a user. For example, the masked element may be an element representing the answer of the user about the exercise. More specifically, when a plurality of first sequences are generated, the server may randomly determine a first sequence including the masked element.

The server inputs the first sequence to the first model to train the first model (S520). For example, the first model may receive the first sequence as input and generate a second sequence. The server may train the first model through comparison between the second sequence and the first sequence.

The server inputs the second sequence predicted by the first model on the basis of the first sequence to the second model to train the second model (S530). For example, the second model may be trained through comparison between the first sequence and a third sequence predicted through the second model on the basis of the second sequence.

In addition, in order to fine-tune the second model, the server may remove the first model, generate a fourth sequence, and input the fourth sequence to the second model. The fourth sequence may include the same elements or similar elements as those of the first sequence. The fine-tuned second model may be a model which has been pre-trained to predict a user score of an exercise.

For example, referring to Equation 3 described above, the fine-tuned second model may predict a test score of the user on the basis of a third loss function which is the sum of a first loss function related to the output value of the first model and a second loss function related to the output value of the second model.

The present description described above may be implemented as a computer-readable code on a medium on which a program is recorded. A computer-readable medium includes all kinds of recording devices storing data which is readable by a computer system. Examples of the computer-readable medium are an HDD (hard disk drive), an SSD (solid state disk), an SDD (silicon disk drive), a ROM, a RAM, a CD-ROM, a magnetic tape, a floppy disk, an optical data storage device, and the like, and also include a carrier wave (e.g., transmission through internet) type. Accordingly, the above detailed description should not be construed as restrictive in all aspects and should be considered as illustrative. The scope of the present description should be determined by a reasonable interpretation of the appended claims, and all modifications within the equivalent scope of the present description are included in the scope of the present description.

In addition, although the above description has been focused on services and embodiments, this is merely an example and does not limit the present description, and those of ordinary skill in the art to which the present description pertains can see that various modifications and applications not exemplified above are possible within the scope not departing from the essential characteristics of the present service and embodiments. For example, each component specifically described in the embodiments may be modified and implemented. Differences related to such modifications and applications should be construed as being included in the scope of the present description as defined by the appended claims.

The invention claimed is:

1. A method for pre-training artificial intelligence models to predict a score of a user by a server, the method comprising:

generating a first sequence for training a first model;

masking an element included in the first sequence and related to an exercise for predicting the score of the user;

inputting the first sequence having the masked element to the first model to train the first model;

outputting, by the first model, as a second sequence, a replaced sequence in which the masked element is replaced with a value predicted by the first model;

training the first model by using a loss function in which the replaced sequence and the original first sequence are compared;

inputting, to a second model, the second sequence predicted by the first model on the basis of the first sequence to train the second model;

training the second model through comparison between the first sequence and a third sequence predicted through the second model on the basis of the second sequence;

removing the first model;

generating a fourth sequence for fine-tuning the second model, wherein the fourth sequence includes the same elements or similar elements as elements of the first sequence; and fine-tuning the second model by using the fourth sequence, wherein the training of the first model comprises training the first model differently depending on whether the masked element is a categorical variable or a continuous variable, and wherein the training of the first model differently comprises:

obtaining an output of the first model by using a softmax layer of the first model based on the masked element being the categorical variable, and obtaining the output of the first model by using a sigmoid layer of the first model based on the masked element being the continuous variable.

2. The method for pre-training according to claim 1, wherein the first sequence includes (1) an identifier of an exercise, (2) a specific part representing a type of the exercise, and (3) an element representing an answer of the user about the exercise.

3. The method for pre-training according to claim 2, wherein the masked element is an element representing the answer of the user about the exercise.

4. The method for pre-training according to claim 3, wherein the first sequence including the masked element is randomly determined on the basis of generation of a plurality of first sequences.

5. The method for pre-training according to claim 1, wherein the fine-tuned second model is pre-trained to predict the score of the user.

6. An apparatus in a server which pre-trains artificial intelligence models to predict a score of a user, the apparatus comprising:

a communication module;

a memory storing instructions; and a processor configured to execute the instructions to:

generate a first sequence for training a first model, mask an element included in the first sequence and related to an exercise for predicting the score of the user, input the first sequence to the first model to train the first model, output, by the first model, as a second sequence, a replaced sequence in which the masked element is replaced with a value predicted by the first model, train the first model by using a loss function in which the replaced sequence and the original first sequence are compared, input, in a second model, the second sequence predicted by the first model on the basis of the first sequence to train the second model, train the second model through comparison between the first sequence and a third sequence predicted through the second model on the basis of the second sequence, remove the first model, generate a fourth sequence for fine-tuning the second model, wherein the fourth sequence includes the same elements or similar elements as elements of the first sequence, and fine-tune the second model by using the fourth sequence, wherein the training of the first model comprises training the first model differently depending on whether the masked element is a categorical variable or a continuous variable, and wherein the training of the first model differently comprises:

obtaining an output of the first model by using a softmax layer of the first model based on the masked element being the categorical variable, and obtaining the output of the first model by using a sigmoid layer of the first model based on the masked element being the continuous variable.

7. The apparatus according to claim 6, wherein the first sequence includes (1) an identifier of an exercise, (2) a specific part representing a type of the exercise, and (3) an element representing an answer of the user about the exercise.

8. The apparatus according to claim 7, wherein the masked element is an element representing the answer of the user about the exercise.

9. The method for pre-training according to claim 5, wherein the fine-tuned second model predicts a test score of the user on the basis of a third loss function which is the sum of a first loss function related to an output value of the first model and a second loss function related to an output value of the second model.

10. The apparatus according to claim 6, wherein the fine-tuned second model is pre-trained to predict the score of the user.

11. The apparatus according to claim 10, wherein the fine-tuned second model predicts a test score of the user on the basis of a third loss function which is the sum of a first loss function related to an output value of the first model and a second loss function related to an output value of the second model.

* * * * *